(12) United States Patent
Christopherson (10) Patent No.: US 6,901,739 B2
(45) Date of Patent: Jun. 7, 2005

(54) GAS TURBINE ENGINE WITH VARIABLE PRESSURE RATIO FAN SYSTEM

(75) Inventor: Charles Kammer Christopherson, Andover, MA (US)

(73) Assignee: General Electric Company, Schenectady, NY (US)

(*) Notice: Subject to any disclaimer, the term of this patent is extended or adjusted under 35 U.S.C. 154(b) by 48 days.

(21) Appl. No.: 10/680,387

(22) Filed: Oct. 7, 2003

(65) Prior Publication Data
US 2005/0072158 A1 Apr. 7, 2005

(51) Int. Cl.[7] ............................................. F02K 3/02
(52) U.S. Cl. .................................................. 60/226.3
(58) Field of Search ........................... 60/226.3, 226.1, 60/262

(56) References Cited

U.S. PATENT DOCUMENTS

| | | | |
|---|---|---|---|
| 3,161,018 A | * | 12/1964 | Sandre .......................... 60/262 |
| 3,673,802 A | | 7/1972 | Krebs et al. |
| 3,879,941 A | * | 4/1975 | Sargisson ..................... 60/226.3 |
| 4,043,121 A | | 8/1977 | Thomas et al. |
| 4,068,471 A | | 1/1978 | Simmons |
| 4,085,583 A | * | 4/1978 | Klees ............................ 60/204 |
| 4,175,384 A | | 11/1979 | Wagenknecht et al. |
| 4,409,788 A | * | 10/1983 | Nash et al. ................. 60/226.3 |
| 5,261,227 A | | 11/1993 | Giffin, III |
| 5,388,964 A | | 2/1995 | Ciokajlo et al. |
| 5,402,638 A | | 4/1995 | Johnson |
| 5,404,713 A | | 4/1995 | Johnson |
| 5,794,432 A | | 8/1998 | Dunbar et al. |
| 5,806,303 A | | 9/1998 | Johnson |
| 5,809,772 A | | 9/1998 | Giffin, III et al. |
| 5,867,980 A | | 2/1999 | Bartos |
| 5,988,980 A | | 11/1999 | Busbey et al. |
| 6,292,763 B1 | | 9/2001 | Dunbar et al. |

FOREIGN PATENT DOCUMENTS

EP     0 567 277 A1     10/1993

* cited by examiner

Primary Examiner—Ehud Gartenberg
(74) Attorney, Agent, or Firm—William Scott Andes; Steven J. Rosen (57) ABSTRACT

A multiple bypass turbofan engine includes axially spaced-apart first and second stage fans of the engine fan connected in driving engagement to a low pressure shaft. A fan bypass duct circumscribes the second stage fan. A first bypass inlet to the fan bypass duct is disposed axially between the first and second stage fans and a second bypass inlet is axially disposed between the second stage fan and an annular core engine inlet. A fan shroud divides the second stage fan blades into radially inner and outer fan hub and tip sections, respectively. The tip sections are radially disposed in a fan tip duct. An axially translatable deflector is positioned to close the fan tip duct when it opens the first bypass inlet and open the fan tip duct when it closes the first bypass inlet.

55 Claims, 8 Drawing Sheets

GAS TURBINE ENGINE WITH VARIABLE PRESSURE RATIO FAN SYSTEM

BACKGROUND OF THE INVENTION

1. Field of the Invention

The invention relates to aircraft gas turbine engines and, particularly, for such engines having multiple fan bypasses.

2. Description of Related Art

A conventional gas turbine engine includes a core engine having in serial, axial flow relationship, a high pressure compressor to compress the airflow entering the core engine, a combustor in which a mixture of fuel and the compressed air is burned to generate a propulsive gas flow, and a high pressure turbine which is rotated by the propulsive gas flow and which is connected by a radially inner relatively large diameter shaft to drive the high pressure compressor. A typical bypass turbofan engine adds a low pressure turbine aft of the high pressure turbine and adds a forward fan forward of the high pressure compressor.

A typical variable bypass ratio design as, disclosed in U.S. Pat. No. 4,068,471, includes one or more forward rows of fan rotor blades in the front fan. The fan rotor blades are connected to a radially inner relatively small diameter drive shaft, which runs through the hollow large diameter shaft and is driven by the low pressure turbine. An aft fan includes one or more aft rows of fan rotor blades connected to the larger-diameter drive shaft and is driven by the high pressure turbine. The aft fan is disposed in serial, axial flow relationship between the forward fan and the high pressure compressor. A variable area bypass injector is located between the forward and aft fans to vary the amount of air entering a first inlet of a fan bypass duct which varies the fan bypass ratio of the engine (i.e., the ratio of the air flowing through the fan bypass duct to the air flowing through the core engine) from which comes the term variable cycle to describe the engine. The fan bypass duct has a second inlet located aft of the aft row of fan blades. Control of airflow directed into the first and second bypass duct inlets was typically accomplished by selector valve mechanisms and some more particular valves called variable bypass injectors commonly referred to as VABIs.

An engine having a fan bypass duct with two or more inlets may be called a multiple bypass stream variable cycle gas turbine engine. A row of stator vanes is typically located just forward of each forward and aft row of fan blades. Selected rows of stator vanes are variable, typically variable angle, to vary the angle of the flow seen by the rotor blades. Some of the engine thrust comes from the propulsive gases exiting the core engine and some from the airflow exiting the fan bypass duct. Variable cycle engines with core driven fan stages have been designed to effectively increase fan bypass stream pressure ratio by using the tip section on the first stage of the core to boost the bypass stream pressure ratio. One example of such a design is disclosed in U.S. Pat. No. 5,809,772 entitled "Turbofan Engine With A Core Driven Supercharged Bypass Duct". They typically utilize a series of guide vanes and doors to modulate the flow to the bypass stream.

There is a need for an aircraft gas turbine engine to operate at high fan hub and bypass stream pressure ratios to provide high specific thrust at takeoff and climb power settings and to operate at low bypass stream pressure ratios to provide good specific fuel consumption during reduced power cruise operation. Although a conventional fan can be made to operate at reduced pressure ratios (limited by choking of the flow within the blading), this will also reduce the hub pressure ratio that supercharges the core, thereby, reducing cycle efficiency and negating the improvements in specific fuel consumption. Typically, there is also a large reduction in fan efficiency at low fan pressure ratios which also reduces improvements in specific fuel consumption.

It is highly desirable to have an aircraft gas turbine engine that can modulate bypass flow from a fan section around a core engine to the bypass stream and to effectively operate at high fan hub and bypass stream pressure ratios to provide high specific thrust at takeoff and climb power settings and to operate at low bypass stream pressure ratios to provide good specific fuel consumption during reduced power cruise operation.

SUMMARY OF THE INVENTION

A multiple bypass turbofan gas turbine engine includes axially spaced-apart first and second stage fans of the engine fan connected in driving engagement to a low pressure shaft, and a fan bypass duct circumscribing the second stage fan. A first bypass inlet to the fan bypass duct is disposed axially between the first and second stage fans and a second bypass inlet to the fan bypass duct is axially disposed between the second stage fan and an annular core engine inlet. First stage fan blades of the first stage fan are axially disposed across a first fan duct and second stage fan blades radially disposed axially across a second fan duct. The second fan duct is located axially aft of the first bypass inlet and disposed radially inwardly of the fan bypass duct. A fan shroud divides the second stage fan blades into radially inner and outer fan hub and tip sections, respectively. The tip sections are radially disposed in a fan tip duct including an annular duct wall having a non-rotatable forward duct wall portion adjacently forward of the rotatable fan shroud. An axially translatable deflector is positioned to close the fan tip duct when it opens the first bypass inlet and open the fan tip duct when it closes the first bypass inlet.

One embodiment of the deflector has a forward conical section followed by an aft cylindrical section. The forward conical section includes a first flow splitter. The non-rotatable forward duct wall portion includes a second flow splitter.

One embodiment of the engine includes a non-rotatable aft duct wall portion of the annular duct wall, is located adjacently aft of the rotatable fan shroud, and axially extends to the second bypass inlet. Another embodiment of the engine includes a non-rotatable retractable aft duct wall portion of the annular duct wall aft of the rotatable fan shroud. The retractable aft wall creates an annular open space axially extending between the second stage fan and the core engine inlet. The second bypass inlet to the fan bypass duct is disposed axially between the open space and the core engine inlet. An annular third splitter is radially disposed between the second bypass inlet and the core engine inlet.

A more particular embodiment of the engine includes a fan section, a core engine, and a low pressure turbine in downstream serial flow relationship. The core engine includes in downstream serial flow relationship a high pressure compressor, a combustor, and a high pressure turbine. The high pressure compressor is connected in driving engagement to the high pressure turbine blades by a core engine shaft. The fan bypass duct circumscribes the second stage fan and the core engine. The engine may further include a tail pipe extending aftwardly between the low pressure turbine and a variable area exhaust nozzle and a rear variable area bypass injector open to the tail pipe and located at a rear end of the fan bypass duct. An afterburner may be incorporated in the tail pipe axially disposed between the variable area exhaust nozzle and the rear variable area bypass injector.

The aircraft gas turbine engine embodiments above can modulate bypass flow from a fan section around a core engine to the bypass stream while effectively operating at high fan hub and bypass stream pressure ratios to provide high specific thrust at takeoff and climb power settings and can operate at low bypass stream pressure ratios to provide good specific fuel consumption during reduced power cruise operation.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
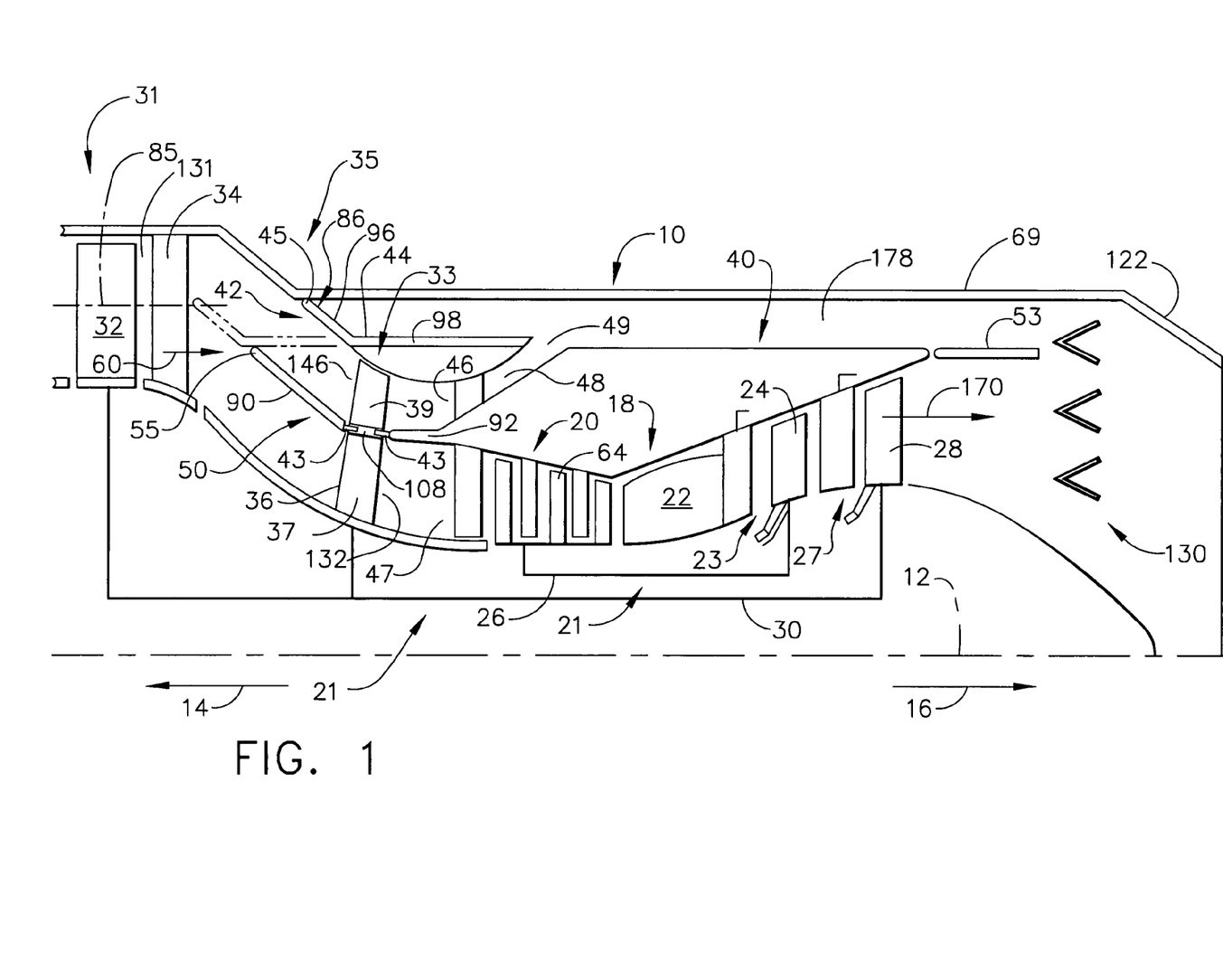
FIG. 1 is a longitudinal sectional view schematical illustration of an aircraft turbofan gas turbine engine with a variable pressure ratio fan.

Illustrated in FIG. 1 is a bypass turbofan engine 10 having a generally axially extending axis or centerline 12 generally extending in a forward direction 14 and an aft direction 16. The bypass turbofan engine 10 includes a core engine 18 (also called a gas generator) which includes a high pressure compressor 20, a combustor 22, and a high pressure turbine (HPT) 23 having a row of high pressure turbine blades 24, all arranged in a serial, axial flow relationship. High pressure compressor blades 64 of the high pressure compressor 20 are fixedly connected in driving engagement to the high pressure turbine blades 24 by a larger-diameter annular core engine shaft 26 which is disposed coaxially about the centerline 12 of the engine 10 forming a high pressure spool 21.

A combustor 22 in the core engine 18 mixes pressurized air from the high pressure compressor 20 with fuel and ignites the resulting fuel and air mixture to produce combustion gases. Some work is extracted from these gases by the high pressure turbine blades 24 which drives the high pressure compressor 20. The combustion gases are discharged from the core engine 18 into a power turbine or low pressure turbine (LPT) 27 having a row of low pressure turbine blades 28. The low pressure turbine blades 28 are fixedly attached to a smaller diameter annular low pressure shaft 30 which is disposed coaxially about the centerline 12 of the engine 10 within the core engine shaft 26 forming a low pressure spool 29. The low pressure shaft 30 rotates axially spaced-apart first and second stage fans 31 and 33 of an engine fan section 35. The first and second stage fans 31 and 33 include first and second stage rows of generally radially outwardly extending and circumferentially spaced-apart first and second stage fan blades 32 and 36, respectively.

A fan bypass duct 40 circumscribes the second stage fan 33 and the core engine 18. Core discharge airflow 170 is discharged from the low pressure turbine 27 to mix with a bypass airflow 178 discharged from the fan bypass duct 40 through a rear variable area bypass injector (VABI) 53. Mixing takes place in a tail pipe 69 in which exhaust flow is formed which is discharged through a variable area exhaust nozzle 122. An optional afterburner 130 may be used to increase the thrust potential of the engine 10.

Figure 2:
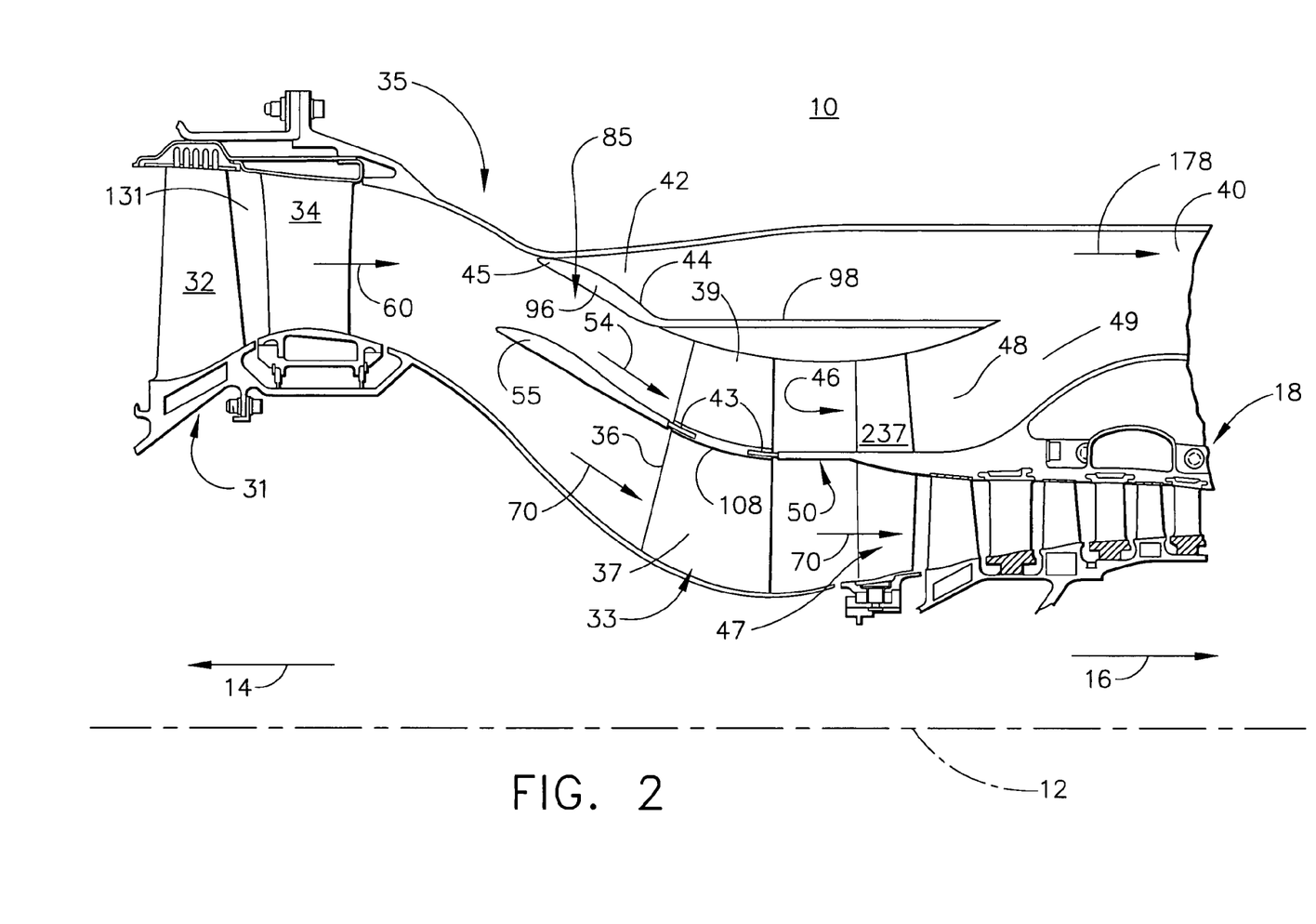
FIG. 2 is a longitudinal sectional view illustration of a forward portion of the aircraft turbofan gas turbine engine illustrated in FIG. 1 configured for a power mode of operation.

Referring to FIGS. 1 and 2, the fan bypass duct 40 has a first bypass inlet 42 disposed axially between the first and second stage fans 31 and 33. A deflector 44 having a first flow splitter 45 at its forward end is axially translatable and positioned to open and close the first bypass inlet 42. The deflector 44 is illustrated as, but not limited to, having a forward conical section 96 including the first flow splitter 45 followed by an aft cylindrical section 98.

A second bypass inlet 46 to the fan bypass duct 40 is disposed axially between the second stage fan 33 and an annular core engine inlet 47 to the core engine 18, thereby, providing two coaxial bypass flowpaths into the fan bypass duct from the forward fan. The fan bypass duct 40 is in fluid communication with the second bypass inlet 46 by way of a second inlet duct 48 having a second duct outlet 49 to the fan bypass duct 40. The first stage fan blades 32 are radially disposed across a first fan duct 131 and the second stage fan blades 36 are radially disposed across a second fan duct 132. The second fan duct 132 begins axially aft of the first bypass inlet 42 and is disposed radially inwardly of the fan bypass duct 40.

A fan shroud 108 divides the second stage fan blades 36 into radially inner and outer panels or fan hub and tip sections 37 and 39, respectively. A second bypass airflow portion 54 is directed through a fan tip duct 146 across the tip sections 39 of second stage fan blades 36 into the second inlet 46. The fan tip duct 146 includes an annular duct wall 50 with a second flow splitter 55 at its forward end. The annular duct wall 50 includes a rotatable portion which is the fan shroud 108 of the second stage fan 33. Non-rotatable forward and aft duct wall portions 90 and 92 of the annular duct wall 50 are located adjacently forward and aft of the rotatable fan shroud 108. The second flow splitter 55 is located at a forward end of the non-rotatable forward duct wall portion 90. Annular seals 43 are provided between the rotatable fan shroud 108 of the annular duct wall 50 and the forward and aft duct wall portions 90 and 92 of the annular duct wall 50. The axially translatable deflector 44 is also positioned to close the fan tip duct 146 when it opens the first bypass inlet 42 and open the fan tip duct 146 when it closes the first bypass inlet 42.

The second stage fan blades 36 are disposed axially aft of the first stage fan blades 32 and a row of circumferentially spaced-apart fan stator vanes 34 is disposed axially between the rows of the first and second stage fan blades 32 and 36. The first bypass inlet 42 includes an axially translatable deflector 44 and a first flow splitter 45. The second stage fan blades 36 are axially disposed between the first and second bypass inlets 42 and 46. There may be additional rows of fan blades and/or fan vanes.

During a high power mode operation of the engine 10, such as takeoff, the axially translatable deflector 44 is axially retracted to an aft axial position 85 as illustrated in FIG. 2. The deflector 44 deflects all of the engine or fan airflow 60 exiting the first stage fan blades 32 across the second flow splitter 55 which splits the fan airflow 60 into a core airflow portion 70 and a second bypass airflow portion 54. The second bypass airflow portion 54 passes through the fan tip duct 146, across the fan tip sections 39, through the second bypass inlet 46, and into the fan bypass duct 40. The core airflow portion 70 passes through the fan hub section 37 and into the core engine 18.

Figure 3:
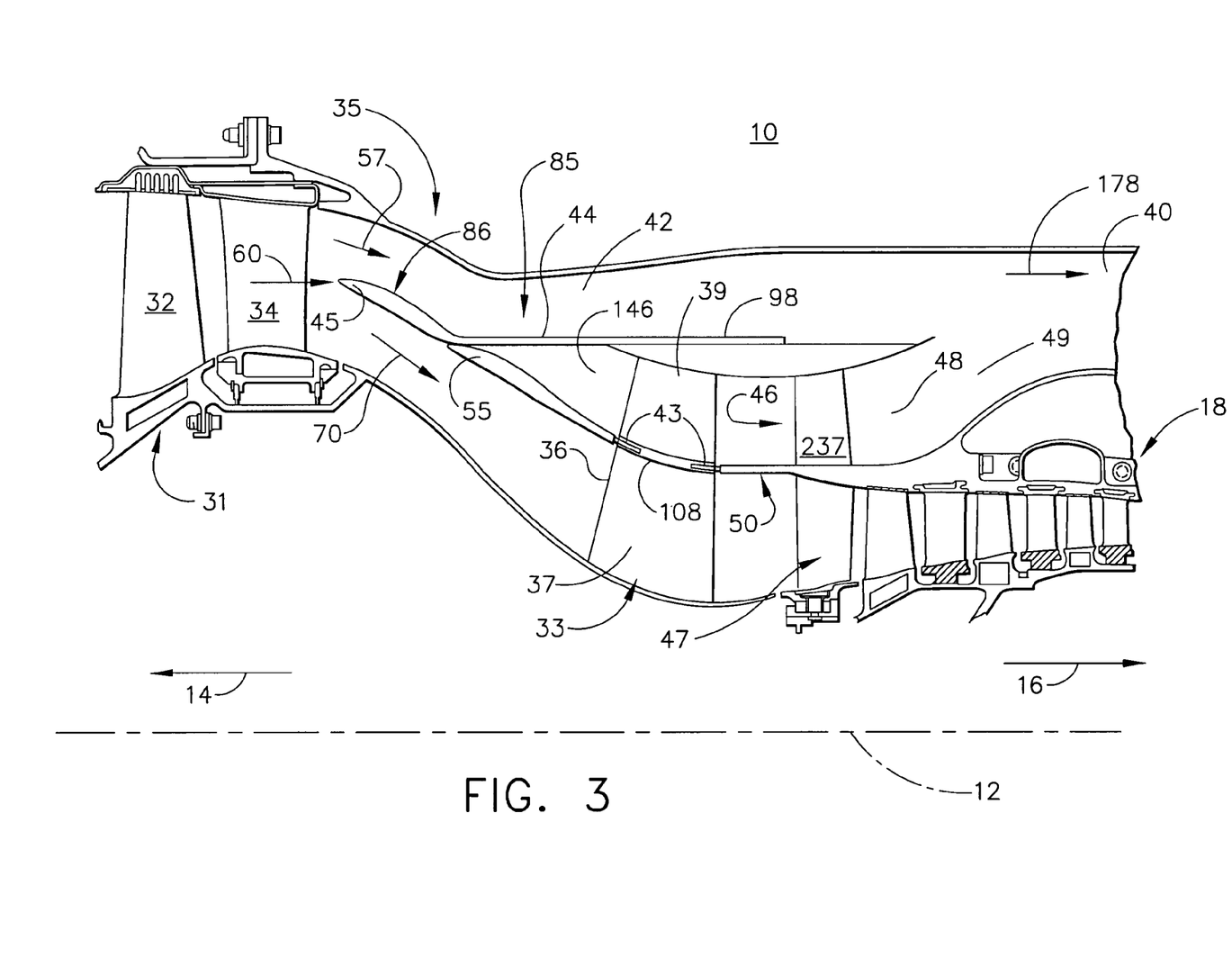
FIG. 3 is a longitudinal sectional view illustration of the forward portion of the aircraft turbofan gas turbine engine illustrated in FIG. 2 configured for a cruise mode of operation.

During low power engine operation, such as a cruise mode, the axially translatable deflector 44 is axially extended to a forward axial position 86 as illustrated in FIG. 3. The first flow splitter 45 of deflector 44 splits the fan airflow 60 exiting the first stage fan blades 32 into a first bypass airflow portion 57 and the core airflow portion 70. In its axially extended position, the deflector 44 also blocks and substantially prevents fan airflow 60 from entering the fan tip duct 146 and flowing across the fan tip sections 39, through the second bypass inlet 46, and into the fan bypass duct 40. The core airflow portion 70 passes through the fan hub section 37 and into the core engine 18.

Figure 4:
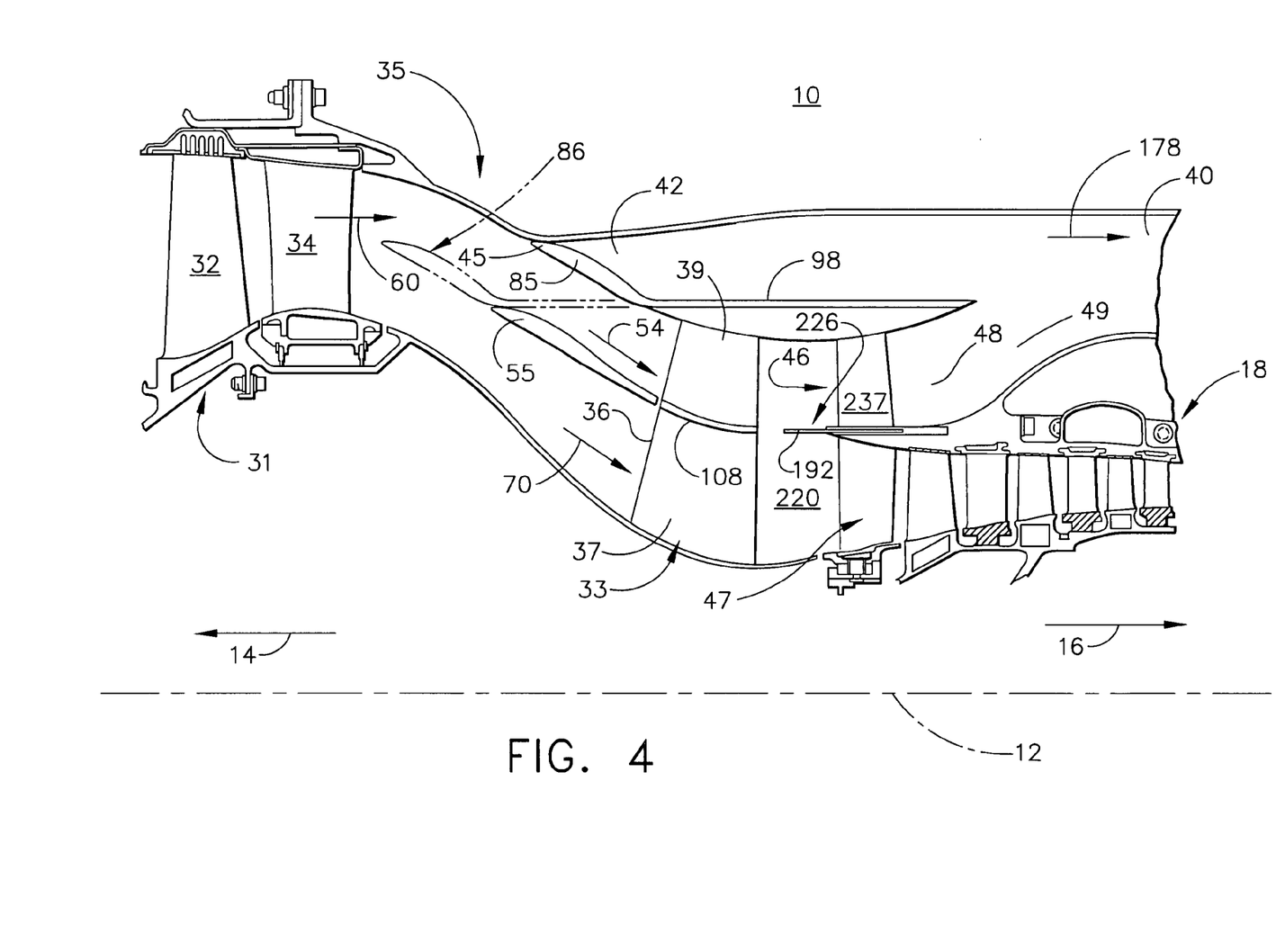
FIG. 4 is a longitudinal sectional view illustration of a forward portion of an alternative embodiment of the aircraft turbofan gas turbine engine illustrated in FIG. 1.
Figure 7:
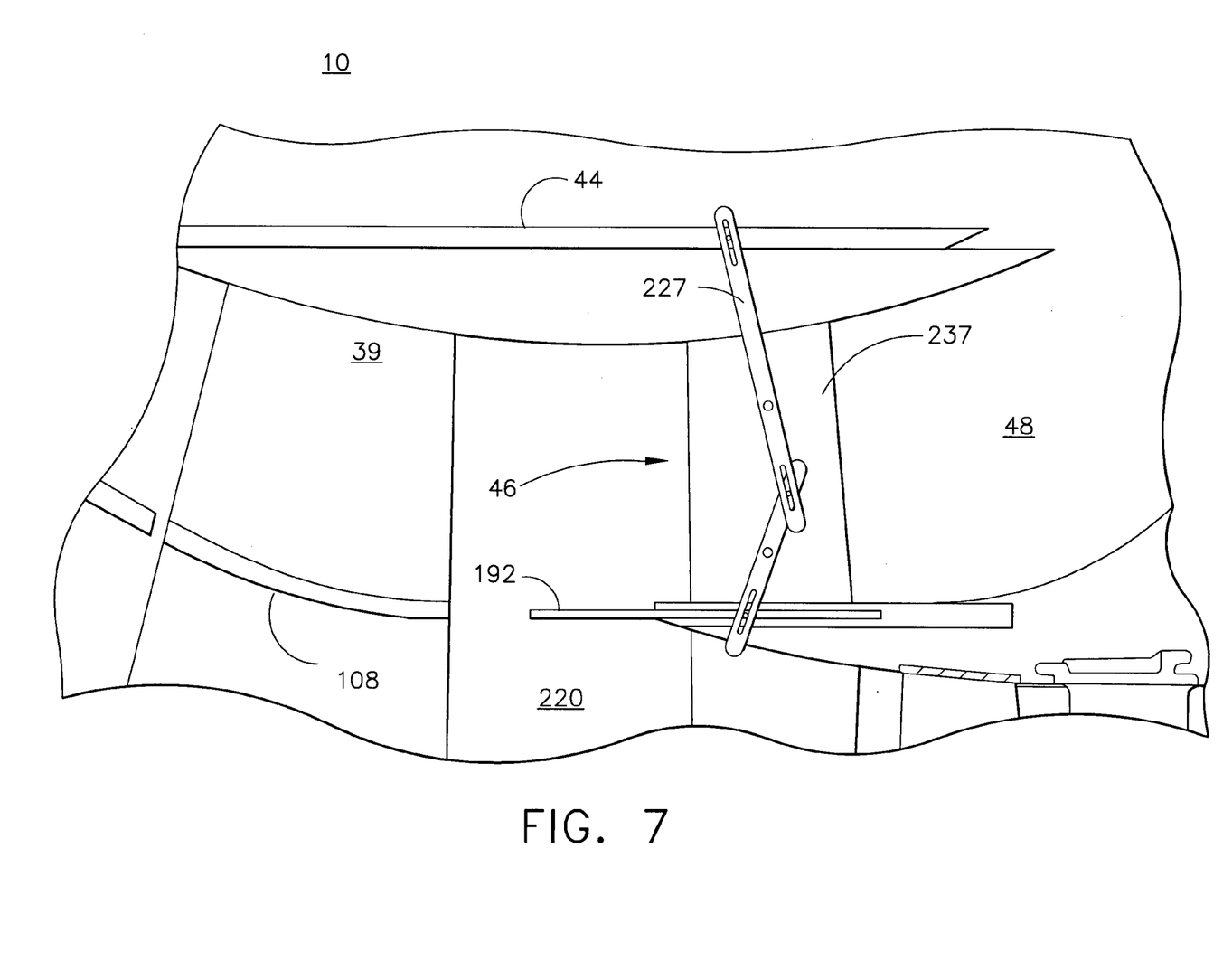
FIG. 7 is a schematic sectional view illustration of a mechanical linkage linking a deflector and an aft duct wall portion of the aircraft turbofan gas turbine engine illustrated in FIG. 4.

Illustrated in FIG. 4 is an alternative embodiment of the engine 10 including non-rotatable retractable aft duct wall portion 192 of the annular duct wall 50 aft of the rotatable fan shroud 108. The retractable aft duct wall portion 192 may be fully or partially extended between the second stage fan blades 36 and the second bypass inlet 46 to the fan bypass duct 40. This gives more flexibility to the engine's operation. The translatably retractable aft duct wall portion 192 may be mechanically linked by a mechanical linkage 227 extending through one or more struts 237 disposed radially across the fan bypass duct 40 as illustrated in FIG. 7.

The mechanical linkage 227 is used to translate the retractable aft duct wall portion 192 directly or proportionally to the translating deflector 44 such that when the deflector 44 is extended fully forwardly the aft duct wall portion 192 is extended fully forwardly and when the deflector 44 is retracted fully aftwardly the aft duct wall portion 192 is also retracted fully aftwardly. Axial movement of the aft duct wall portion 192 may be linked, mechanically or otherwise, to the translating deflector 44 in a non-linear relationship in order to operably control the tip to hub flow split aft of the second stage fan 33. In this embodiment of the engine the deflector 44 is linked to the retractable aft duct wall portion 192 such that the retractable aft duct wall portion 192 extends and retracts in non-linear relationship with respect to the deflector 44.

Figure 8:
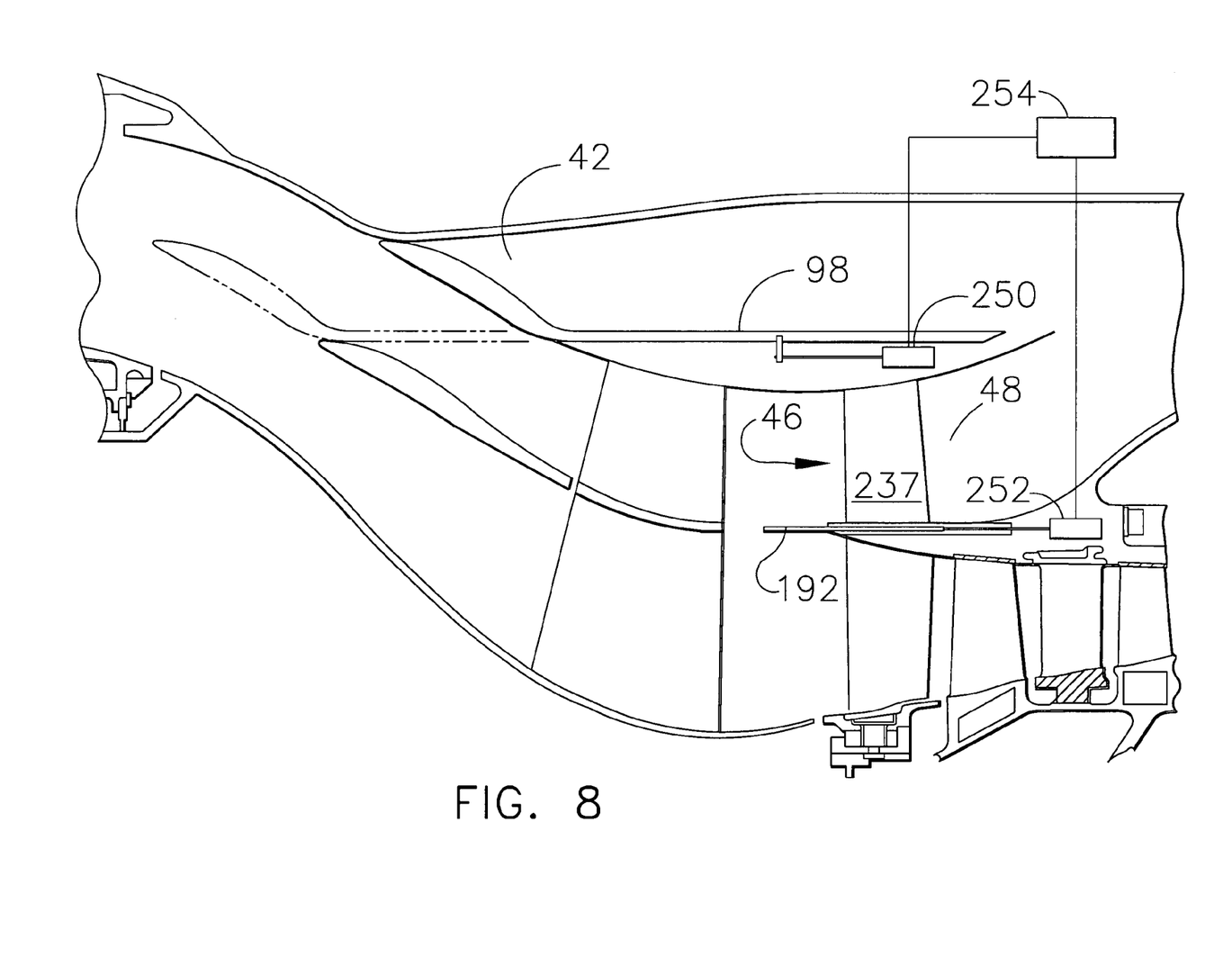
FIG. 8 is a schematical sectional view illustration of actuators operated by a controller to directly or proportionally translate the deflector and aft duct wall portion of the aircraft turbofan gas turbine engine illustrated in FIG. 4.

Alternatively, an actuating system having separate first and second actuators 250 and 252 may be used to translate the deflector 44 and the aft duct wall portion 192 respectively. The first and second actuators 250 and 252 may be controllably linked by the actuating system and controlled by a controller 254 to directly or proportionally translate the deflector 44 and the aft duct wall portion 192. Alternatively the deflector 44 and the aft duct wall portion 192 may be independently controlled by the controller according to a predetermined relationship or modulated via closed loop controllers operating on various feedback signals within the engine to optimize engine and or aircraft operation.

Figure 5:
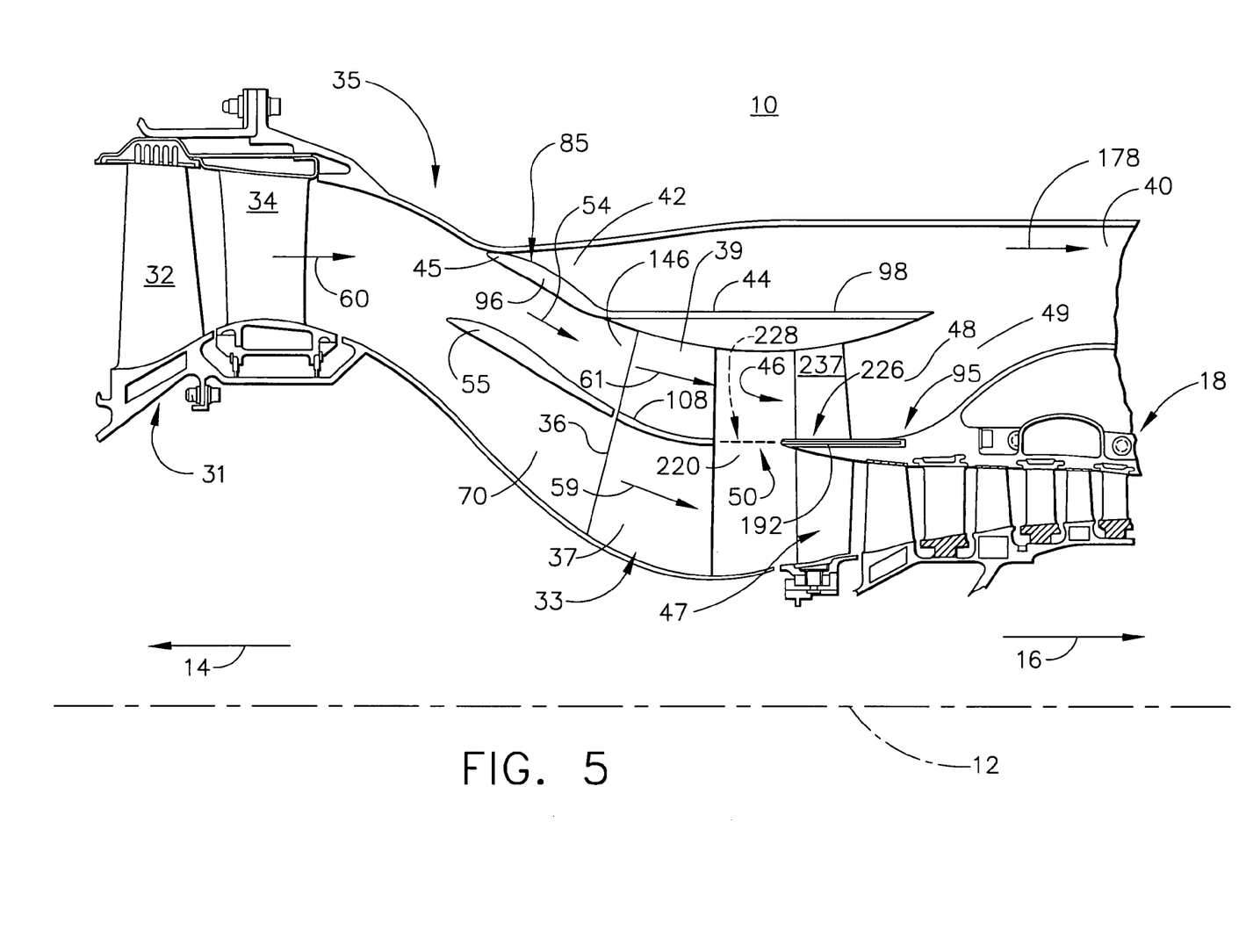
FIG. 5 is a longitudinal sectional view illustration of the forward portion of a first alternative embodiment of the aircraft turbofan gas turbine engine illustrated in FIG. 1 configured for a power mode of operation.
Figure 6:
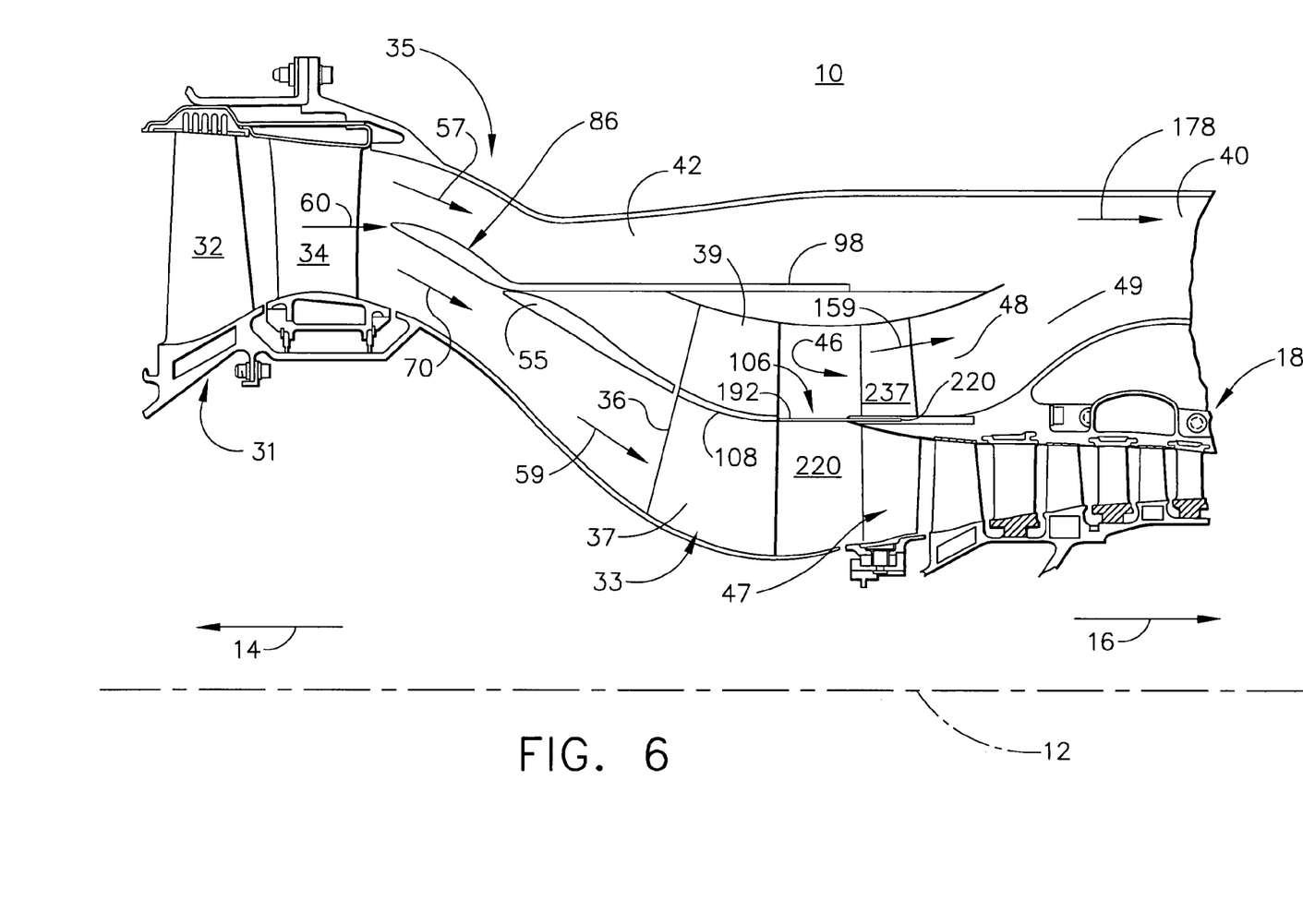
FIG. 6 is a longitudinal sectional view illustration of the forward portion of a first alternative embodiment of the aircraft turbofan gas turbine engine illustrated in FIG. 5 configured for a cruise mode of operation.

High and low power modes of the alternative embodiment of the engine 10 are illustrated in FIGS. 5 and 6, respectively. The second stage fan blades 36 radially extend across the second fan duct 132 which extend axially to the core engine inlet 47 of the core engine 18. The second flow splitter 55 splits the fan airflow 60 into a hub airflow 59 and tip airflow 61 which flow across the fan hub sections 37 and fan tip sections 39 respectively of the second stage fan blades 36.

An annular open space 220 within the second fan duct 132 axially extends between the second stage fan blades 36 and the core engine inlet 47. The second bypass inlet 46 to the fan bypass duct 40 is disposed axially between the open space 220 and the core engine inlet 47 to the core engine 18. An annular third splitter 226 is radially disposed between the second bypass inlet 46 and the core engine inlet 47. The second bypass inlet 46 is open to the open space 220 to allow some of the hub airflow 59 flowing through the fan hub section 37 to flow as a third bypass airflow portion 159 to the fan bypass duct 40. The remaining hub airflow 59 provides core airflow portion 70 to the core engine 18. This allows the hub airflow 59 and the bypass airflow 178 to better match or control downstream pressure balance.

During high power mode operation of the alternative embodiment of the engine 10, the axially translatable deflector 44 is axially retracted to an aft axial position 85 and the aft duct wall 192 is axially retracted to an aft position 95 as illustrated in FIG. 5. In this position, the axially translatable deflector 44 opens the fan tip duct 146 and closes the first bypass inlet 42. The deflector 44 deflects all of the engine or fan airflow 60 exiting the first stage fan blades 32 across the second flow splitter 55 which splits the fan airflow 60 into a core airflow portion 70 and a second bypass airflow portion 54. The second bypass airflow portion 54 passes through the fan tip duct 146, across the fan tip sections 39, and then across the open space 220.

Substantially, all or most of the second bypass airflow portion 54 then goes through the second bypass inlet 46, and into the fan bypass duct 40. The core airflow portion 70 passes through the fan hub section 37 and then substantially all into the core engine 18. The open space 220 allows the hub airflow 59 and the second bypass airflow portion 54 to have a flow interface 228, thus, allowing pressure balancing of the bypass airflow 178.

During low power engine operation, the axially translatable deflector 44 is axially extended to a forward axial position 86 and the aft duct wall 192 is axially extended to a forward position 106 as illustrated in FIG. 6 and the system operates as described for the engine illustrated in FIG. 3.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A multiple bypass turbofan gas turbine engine comprising:
   - axially spaced-apart first and second stage fans of the engine fan connected in driving engagement to a low pressure shaft;
   - a fan bypass duct circumscribing the second stage fan;
   - a first bypass inlet to the fan bypass duct disposed axially between the first and second stage fans;
   - a second bypass inlet to the fan bypass duct axially disposed between the second stage fan and an annular core engine inlet;
   - first stage fan blades of the first stage fan disposed axially across a first fan duct and second stage fan blades radially disposed axially across a second fan duct;
   - the second fan duct located axially aft of the first bypass inlet and disposed radially inwardly of the fan bypass duct;
   - a fan shroud dividing the second stage fan blades into radially inner and outer fan hub and tip sections, respectively;
   - the tip sections radially disposed in a fan tip duct including an annular duct wall having a non-rotatable forward duct wall portion adjacently forward of the rotatable fan shroud; and
   - an axially translatable deflector positioned to close the fan tip duct when it opens the first bypass inlet and open the fan tip duct when it closes the first bypass inlet.

2. An engine as claimed in claim 1 further comprising the deflector having a forward conical section including followed by an aft cylindrical section.

3. An engine as claimed in claim 2 further comprising the forward conical section having a first flow splitter.

4. An engine as claimed in claim 3 further comprising the non-rotatable forward duct wall portion having a second flow splitter.

5. An engine as claimed in claim 1 further comprising the annular duct wall having non-rotatable aft duct wall portion of the annular duct wall located adjacently aft of the rotatable fan shroud and axially extending to the second bypass inlet.

6. An engine as claimed in claim 5 further comprising the deflector having a forward conical section including followed by an aft cylindrical section.

7. An engine as claimed in claim 6 further comprising the forward conical section having a first flow splitter and the non-rotatable forward duct wall portion having a second flow splitter.

8. An engine as claimed in claim 1 further comprising an annular open space axially extending between the second stage fan and the core engine inlet and a non-rotatable retractable aft duct wall portion of the annular duct wall aft of the rotatable fan shroud.

9. An engine as claimed in claim 8 wherein the second bypass inlet to the fan bypass duct is disposed axially between the open space and the core engine inlet and the retractable aft duct wall portion is radially disposed between the second bypass inlet and the core engine inlet.

10. An engine as claimed in claim 9 further comprising the deflector having a forward conical section including followed by an aft cylindrical section.

11. An engine as claimed in claim 10 further comprising the forward conical section having a first flow splitter.

12. An engine as claimed in claim 11 wherein the second bypass inlet to the fan bypass duct is disposed axially between the open space and the core engine inlet and the retractable aft duct wall portion is radially disposed between the second bypass inlet and the core engine inlet.

13. An engine as claimed in claim 8 further comprising the aft duct wall portion being controllably linked to the deflector.

14. An engine as claimed in claim 13 wherein the second bypass inlet to the fan bypass duct is disposed axially between the open space and the core engine inlet and the retractable aft duct wall portion is radially disposed between the second bypass inlet and the core engine inlet.

15. An engine as claimed in claim 14 further comprising the deflector having a forward conical section including followed by an aft cylindrical section.

16. An engine as claimed in claim 15 further comprising the forward conical section having a first flow splitter.

17. An engine as claimed in claim 16 wherein the second bypass inlet to the fan bypass duct is disposed axially between the open space and the core engine inlet and the retractable aft duct wall portion is radially disposed between the second bypass inlet and the core engine inlet.

18. A multiple bypass turbofan gas turbine engine comprising:
   - a fan section, a core engine, and a low pressure turbine in downstream serial flow relationship;
   - the core engine including in downstream serial flow relationship a high pressure compressor, a combustor, and a high pressure turbine;
   - the high pressure compressor connected in driving engagement to the high pressure turbine blades by a core engine shaft;
   - axially spaced-apart first and second stage fans of the engine fan connected in driving engagement to the low pressure turbine by a low pressure shaft;
   - a fan bypass duct circumscribing the second stage fan and the core engine;
   - a first bypass inlet to the fan bypass duct disposed axially between the first and second stage fans;
   - a second bypass inlet to the fan bypass duct axially disposed between the second stage fan and an annular core engine inlet to the core engine;
   - first stage fan blades of the first stage fan disposed axially across a first fan duct and second stage fan blades radially disposed axially across a second fan duct;
   - the second fan duct located axially aft of the first bypass inlet and disposed radially inwardly of the fan bypass duct;
   - a fan shroud dividing the second stage fan blades into radially inner and outer fan hub and tip sections, respectively;
   - the tip sections radially disposed in a fan tip duct including an annular duct wall having a non-rotatable forward duct wall portion adjacently forward of the rotatable fan shroud; and
   - an axially translatable deflector positioned to close the fan tip duct when it opens the first bypass inlet and open the fan tip duct when it closes the first bypass inlet.

19. An engine as claimed in claim 18 further comprising the deflector having a forward conical section including followed by an aft cylindrical section.

20. An engine as claimed in claim 19 further comprising the forward conical section having a first flow splitter.

21. An engine as claimed in claim 20 further comprising the non-rotatable forward duct wall portion having a second flow splitter.

22. An engine as claimed in claim 18 further comprising the annular duct wall having non-rotatable aft duct wall portion of the annular duct wall located adjacently aft of the rotatable fan shroud and axially extending to the second bypass inlet.

23. An engine as claimed in claim 22 further comprising the deflector having a forward conical section including followed by an aft cylindrical section.

24. An engine as claimed in claim 23 further comprising the forward conical section having a first flow splitter and the non-rotatable forward duct wall portion having a second flow splitter.

25. An engine as claimed in claim 18 further comprising an annular open space axially extending between the second stage fan and the core engine inlet and a non-rotatable retractable aft duct wall portion of the annular duct wall aft of the rotatable fan shroud.

26. An engine as claimed in claim 25 wherein the second bypass inlet to the fan bypass duct is disposed axially between the open space and the core engine inlet and the retractable aft duct wall portion is radially disposed between the second bypass inlet and the core engine inlet.

27. An engine as claimed in claim 26 further comprising the deflector having a forward conical section including followed by an aft cylindrical section.

28. An engine as claimed in claim 27 further comprising the forward conical section having a first flow splitter.

29. An engine as claimed in claim 28 wherein the second bypass inlet to the fan bypass duct is disposed axially between the open space and the core engine inlet and the retractable aft duct wall portion is radially disposed between the second bypass inlet and the core engine inlet.

30. An engine as claimed in claim 18 further comprising:
a tail pipe extending aftwardly between the low pressure turbine and a variable area exhaust nozzle, and
a rear variable area bypass injector open to the tail pipe and located at a rear end of the fan bypass duct.

31. An engine as claimed in claim 30 further comprising an afterburner in the tail pipe axially disposed between the variable area exhaust nozzle and the rear variable area bypass injector.

32. An engine as claimed in claim 31 further comprising the deflector having a forward conical section including followed by an aft cylindrical section.

33. An engine as claimed in claim 32 further comprising the forward conical section having a first flow splitter.

34. An engine as claimed in claim 33 further comprising the non-rotatable forward duct wall portion having a second flow splitter.

35. An engine as claimed in claim 30 further comprising the non-rotatable aft duct wall portion of the annular duct wall located adjacently aft of the rotatable fan shroud and axially extending to the second bypass inlet.

36. An engine as claimed in claim 35 further comprising the deflector having a forward conical section including followed by an aft cylindrical section.

37. An engine as claimed in claim 36 further comprising the forward conical section having a first flow splitter and the non-rotatable forward duct wall portion having a second flow splitter.

38. An engine as claimed in claim 30 further comprising an annular open space axially extending between the second stage fan and the core engine inlet.

39. An engine as claimed in claim 38 wherein the second bypass inlet to the fan bypass duct is disposed axially between the open space and the core engine inlet.

40. An engine as claimed in claim 39 further comprising the deflector having a forward conical section including followed by an aft cylindrical section.

41. An engine as claimed in claim 40 further comprising the forward conical section having a first flow splitter.

42. An engine as claimed in claim 41 further comprising an annular third splitter radially disposed between the second bypass inlet and the core engine inlet.

43. An engine as claimed in claim 30 further comprising an annular open space axially extending between the second stage fan and the core engine inlet and a non-rotatable retractable aft duct wall portion of the annular duct wall aft of the rotatable fan shroud.

44. An engine as claimed in claim 43 wherein the second bypass inlet to the fan bypass duct is disposed axially between the open space and the core engine inlet and the retractable aft duct wall portion is radially disposed between the second bypass inlet and the core engine inlet.

45. An engine as claimed in claim 44 further comprising the deflector having a forward conical section including followed by an aft cylindrical section.

46. An engine as claimed in claim 45 further comprising the forward conical section having a first flow splitter.

47. An engine as claimed in claim 46 wherein the second bypass inlet to the fan bypass duct is disposed axially between the open space and the core engine inlet and the retractable aft duct wall portion is radially disposed between the second bypass inlet and the core engine inlet.

48. An engine as claimed in claim 26 further comprising the deflector is linked to the retractable aft duct wall portion such that when the deflector extends forwardly the aft duct wall portion extends forwardly and when the deflector retracts aftwardly the aft duct wall portion retracts aftwardly.

49. An engine as claimed in claim 48 further comprising the deflector having a forward conical section including followed by an aft cylindrical section.

50. An engine as claimed in claim 49 further comprising the forward conical section having a first flow splitter.

51. An engine as claimed in claim 48 wherein the second bypass inlet to the fan bypass duct is disposed axially between the open space and the core engine inlet and the retractable aft duct wall portion is radially disposed between the second bypass inlet and the core engine inlet.

52. An engine as claimed in claim 48 further comprising a mechanical linkage linking the deflector to the retractable aft duct wall portion.

53. An engine as claimed in claim 52 further comprising the mechanical linkage proportionally linking the deflector to the retractable aft duct wall portion.

54. An engine as claimed in claim 48 further comprising the deflector linked to the retractable aft duct wall portion such that the retractable aft duct wall portion extends and retracts in non-linear relationship with respect to the deflector.

55. An engine as claimed in claim 48 further comprising:
first and second actuators translatably operably connected to the deflector and the aft duct wall portion respectively,
the first and second actuators controllably linked by an actuating system, and
the actuating system is controlled by a controller to directly or proportionally translate the deflector and the aft duct wall portion.

* * * * *